(12) United States Patent
McCready

(10) Patent No.: US 11,737,604 B2
(45) Date of Patent: Aug. 29, 2023

(54) CONTINUOUS INJECTOR-BASTER DEVICE

(71) Applicant: Michael McCready, Ossining, NY (US)

(72) Inventor: Michael McCready, Ossining, NY (US)

(*) Notice: Subject to any disclaimer, the term of this patent is extended or adjusted under 35 U.S.C. 154(b) by 0 days.

(21) Appl. No.: 17/950,775

(22) Filed: Sep. 22, 2022

(65) Prior Publication Data

US 2023/0012589 A1  Jan. 19, 2023

(51) Int. Cl.
  *A47J 43/00* (2006.01)
  *A47J 44/00* (2006.01)
  *A22C 9/00* (2006.01)
  *A47J 27/00* (2006.01)

(52) U.S. Cl.
  CPC ............ *A47J 43/005* (2022.01); *A22C 9/001* (2013.01); *A47J 27/002* (2013.01); *A47J 44/00* (2013.01)

(58) Field of Classification Search
  CPC ........ A47J 43/16; A47J 43/005; A47J 37/106; A22C 9/001; A22C 17/0053; A23L 13/72; A23L 13/75; A23B 4/26–305
  See application file for complete search history.

(56) References Cited

U.S. PATENT DOCUMENTS

| | | | |
|---|---|---|---|
| 3,441,980 A | 5/1969 | Defenbaugh | |
| 4,782,746 A | 11/1988 | Niccolls | |
| 2010/0021618 A1* | 1/2010 | Van Esbroeck | A22C 21/0061 |
| | | | 426/644 |
| 2017/0325293 A1 | 11/2017 | Bach et al. | |
| 2018/0153342 A1 | 6/2018 | Gostelow | |
| 2019/0364934 A1* | 12/2019 | Gillette | A23B 4/28 |
| 2020/0196799 A1 | 6/2020 | Alvarez | |
| 2021/0093122 A1 | 4/2021 | DuBose | |
| 2021/0282598 A1 | 9/2021 | Jackson | |

* cited by examiner

*Primary Examiner* — John J Norton
(74) *Attorney, Agent, or Firm* — Michael J. Feigin, Esq.; Feigin and Fridman LLC

(57) ABSTRACT

A continuous injector-baster device of embodiments of the disclosed technology includes at least one hollow and coiled tube through which liquid is heated and flows into a food product, as well as at least one spray head through while liquid is sprayed on the same food product. A pump circulates the liquid through the hollow and coiled tube and sprays it from the spray head.

20 Claims, 6 Drawing Sheets

CONTINUOUS INJECTOR-BASTER DEVICE

FIELD OF THE DISCLOSED TECHNOLOGY

The disclosed technology relates generally to injectors and basters, and more specifically, to a combined device for continuously injecting and basting a food while the food is inside a pot.

BACKGROUND OF THE DISCLOSED TECHNOLOGY

Some of the most popular methods of cooking meat involve the use of dry heat. These methods, including grilling, broiling, and roasting, are all commonly found in both commercial and home settings.

One challenge commonly encountered when using these methods is the difficulty in keeping the meat being cooked from becoming dry and unappetizing in the process. To overcome this, many cooks re-apply liquids to the meat throughout the cooking process, a method commonly referred to as basting. This, however, comes with its own difficulties. Basting forces the cook to be involved throughout the time that the meat is cooking, making the process unnecessarily arduous. It also requires the meat to be removed from the heat during the cooking process, making the overall effect less even.

There is therefore a need for a method for cooking meat with dry heat in a way that does not require human time or intervention in order to keep the meat from drying out.

SUMMARY OF THE DISCLOSED TECHNOLOGY

A continuous injector and baster device for use within a cooking vessel which is equipped with a heating element includes a manifold, a pump, and at least one of each of a hollow injector tube and a basting spray head. The pump is adapted to be removably connected to said manifold, such as by way of a hollow tube. Each of the at least one hollow injector tubes and basting spray heads are connected at a first end thereof to the manifold. The at least one hollow injector tube is removably connected at a second end thereof to a place within the cooking vessel where a piece of food is expected.

In embodiments, each hollow injector tube is connected at a second end thereof to an injector needle. The at least one hollow injector tube may be a plurality of hollow injector tubes, and the at least one basting spray head may be a plurality of basting spray heads.

The manifold may include a plurality of openings, each of which may be controlled by a dedicated valve. Each valve, in embodiments, is a cylindrical controller which is rotatably positionable into at least an open position and a closed position. Each hollow injector tube and each basting spray head may be removably attachable at their first ends to each opening of the manifold.

Furthermore, the manifold may have a plurality of internal compartments, each connected to at least one opening of the manifold, and each individually connected to the pump. In some embodiments, each compartment of the manifold is adapted to hold a unique liquid therein. The compartments are composed such that while each valve is in the closed position, each unique liquid will remain unadulterated by every other unique liquid within every other internal compartments.

In various embodiments of the disclosed technology, the manifold is located within and/or attached to the heating element. Furthermore, as a result of the proximity of the manifold to the heating element, at least one liquid located within the manifold is heated by the heating element. In other embodiments, at least one hollow injector tube is removably attached and/or is proximate to the heating element, such that at least one liquid located within the tube is heated by the heating element.

In various embodiments, the pump may be located within and/or may be attached to the heating element, such that operation of the pump is driven by the heating element.

The technology disclosed herein may further include a kit which includes the above-described manifold, pump, and at least one of each of a hollow injector tube and a basting spray head, as well as a cooking vessel. The cooking vessel may be or include a convection heating element. In embodiments, the kit manifold includes a plurality of openings. Each of the openings may be controlled by a dedicated valve, possibly one which is made of a cylindrical controller which is rotatably positionable into at least an open position and a closed position. In various embodiments of the disclosed technology, each tube of the plurality of hollow injector tubes is connected at a second end thereof to an injector needle.

The manifold may be removably attachable to the convection heating element. Each hollow injector tube and each basting spray head may be removably attachable at their first ends to each opening of the manifold at a point on the manifold which is vertically below a point of connection between the manifold and the convection heating element. It may include several internal compartments, each connected to at least one manifold opening, and each individually connected to the pump.

Each of the internal compartments of the manifold, in embodiments, is adapted to hold a unique liquid therein in such a way that while every valve controlling the openings is in the closed position, each unique liquid will remain unadulterated by every other unique liquid within the internal compartments. Each compartment may be located proximally to the convection heating element, such that the unique liquid held therein is heated by its proximity to the convection heating element. Furthermore, the manifold may be located within and/or attached to the heating element, such that at least one liquid located therein is heated by the heating element.

In embodiments, operation of the pump is substantially unchanged when the pump operates while without the cooking vessel and while the pump operates while within the cooking vessel.

At least one hollow injector tube may be removably attached to and/or proximate to the convection heating element, such that at least one liquid located within said tube is heated by the convection heating element due to that proximity. Furthermore, the pump may be located within and/or attached to the convection heating element, such that operation of the pump is driven by the heating element.

A method of using the continuous injector and baster device for use within a cooking vessel, which is equipped with a heating element includes a manifold, a pump, and at least one of each of a hollow injector tube and a basting spray head, includes several steps, in any order. One of these steps is a step of inserting at least one liquid into the manifold. Another of these steps is a step of attaching at least one basting spray head to at least one opening of the manifold. Another of these steps is a step of attaching at least one hollow injector tube to at least one opening of the manifold at a first end thereof.

An additional step of this method includes attaching the at least one hollow injector tube to an injector needle at a second end thereof. Another step includes placing the second end of the at least one injector tube and the injector needle at the second end thereof at a point within the cooking vessel where a piece of food is expected. Another step includes opening a valve of the manifold connected to an opening of the manifold where the at least one baster spraying head and/or hollow injector tube is attached. Other steps included are a step of turning on the heating element of said cooking vessel and a step of turning on the pump.

A further method of using the above-described kit, which includes the above-described manifold, pump, and at least one of each of a hollow injector tube and a basting spray head, as well as a cooking vessel which may be or include a convection heating element, is described herein. The method includes several steps, in any order. These steps include inserting at least one liquid into at least one manifold compartment, and attaching at least one basting spray head to at least one manifold opening. Further steps include steps of attaching at least one hollow injector tube to at least one manifold opening at a first end thereof, and a step of placing the second end of the at least one injector tube and the injector needle at the second end thereof at a point within the cooking vessel where a piece of food is expected. Other steps include opening a manifold valve to a manifold opening where at least one baster spraying head and/or where the at least one hollow injector tube is attached, and turning on the convection heating element of the cooking vessel.

In embodiments, the above-described method of using the above-described kit included an additional step of attaching the at least one hollow injector tube to an injector needle at a second end thereof. Furthermore, the step of turning on the convection heating element of the cooking vessel may include simultaneously turning on the pump.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

A continuous injector-baster device of embodiments of the disclosed technology includes at least one hollow and coiled tube through which liquid is heated and flows into a food product, as well as at least one spray head through while liquid is sprayed on the same food product. A pump circulates the liquid through the hollow and coiled tube and sprays it from the spray head.

Embodiments of the disclosed technology will become more clear in view of the following discussion of the figures.

Figure 1:
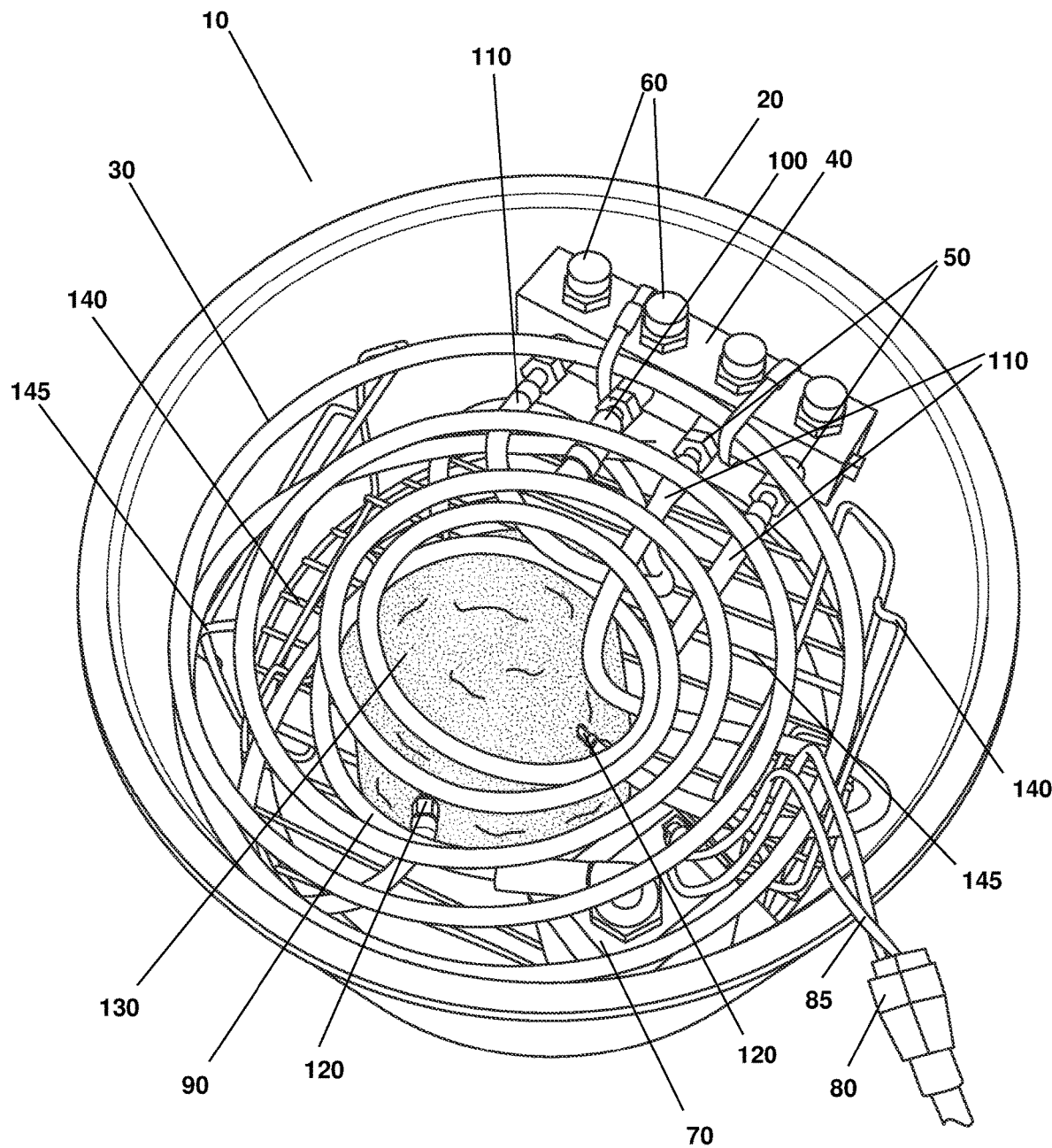
FIG. 1 shows a top and front perspective view of a Continuous Injector-Baster Device of an embodiment of the disclosed technology.

FIG. 1 shows a top and front perspective view of a Continuous Injector-Baster Device of an embodiment of the disclosed technology. The device 10 includes a cooking vessel 20 which, as shown in the figure, contains a majority of components of the device 10.

In the embodiment shown, the device 10 includes a heating element 30 which comprises a metal coil, such as a copper coil. In the embodiment shown, the heating element 30 is positioned above a piece of food 130, and is closer to a top opening of the cooling vessel 20 than an opposite bottom side thereof. In various embodiments, the heating element 30 may be made of any material, shape, and location such that its temperature may be repeatedly and reliably raised and lowered. More specifically, the heating element 30 may be made of any material, shape, and location such that its temperature may be repeatedly and reliably raised to and lowered from a temperature at which a liquid being circulated proximally thereto is heated to a temperature below its boiling point without significantly affecting and/or impeding a cooking process of the food 130 within the cooking vessel 20.

In the embodiment show, the device 10 includes a manifold 40. The manifold 40 includes at least one opening 50, and may include a plurality of openings 50. Each of the openings 50 is controlled by at least one valve 60, which is rotatably into at least an open position and a closed position. Each of the plurality of openings 50 may further be independently controlled by a dedicated valve 60. The manifold 10 is connected to at least one pump 70 which drives at least one liquid through at least one of the plurality of openings 50.

The heating element 30 may be driven by a power source 80, which may simultaneously drive the pump 70. The power source 80 may be within or without the cooking vessel 20, and may be connected to the pump 70 and/or the heating element 30 via wires 85. In other embodiments, the heating element 30 is driven by an independent power source (not shown in the figures) which may be within or without the cooking vessel 20. The heating element 30 may further be driven by a power source which simultaneously is internal and/or integral to the cooking vessel 20, such as a power source which drives operation of a lid thereof.

The device 10, as shown in the figure, includes at least one basting spray head 100 and at least one hollow injector tube 110. Each of the basting spray heads 100 and each of the hollow injector tubes 110 may be removably attachable to and detachable from each of the openings 50 of the manifold 40. The various hollow injector tubes 110 may be of varying lengths and thicknesses, such that each hollow injector tube 110 has a unique internal capacity.

Each of the hollow injector tubes 110 may be made of any material or combination of materials having a permeability such that a liquid passing there-through enters and exits an internal area of the tube 110 only through an opening at an extreme end thereof. Furthermore, each of the hollow injector tubes 110 may be made of any material or combination of materials having an internal structure such that a liquid passing there-through remains substantially unadulterated by the material, including when the tube and the liquid passing there-through are heated to a temperature such that the liquid is heated without boiling. Each of the hollow injector tubes 110 ends in an injector needle 120. The injector needles 120 may be removable from and reattachable to the hollow injector tubes 110.

Each of the basting spray heads 100 has holes therein through which a liquid within the manifold 40 may be ejected due to pressure from the pump 70. Each of the basting spray heads 100 may further include a rotatable joint, such that the basting spray head 100 may be positioned with its holes facing one of several directions.

Figure 2:
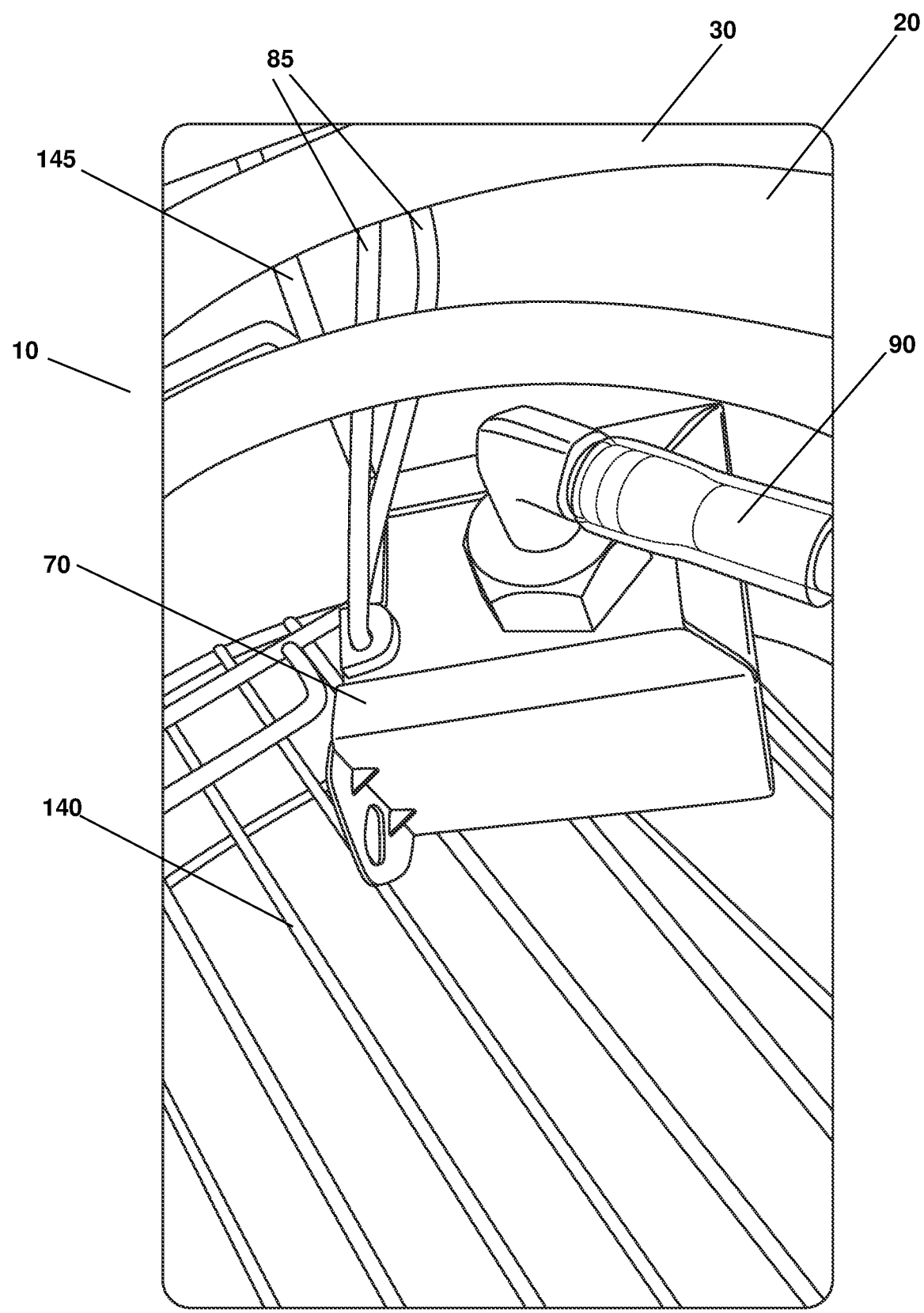
FIG. 2 shows a zoomed-in top and front perspective view of a part of the device of FIG. 1.

FIG. 2 shows a zoomed-in top and front perspective view of a part of the device of FIG. 1. As shown in the figures, the pump 70 is connected to the manifold 40 by way of a hollow tube 90. The pump 70 may be removably attachable to the hollow tube 90, and the manifold 40 may be removably attachable to the hollow tube 90. In the figure, the pump 70 is connected to an external power source 80 (not shown) by way of wires 85. The external power source 80 is independent of a power source (not shown) which powers the heating element 30. In some embodiments, the external power source 80 simultaneously power is both the pump 70 and the heating element 30. Furthermore, the pump 70 and the heating element 30 may form a unitary structure. In some embodiments, the device 10 may include multiple pumps 70.

Figure 3:
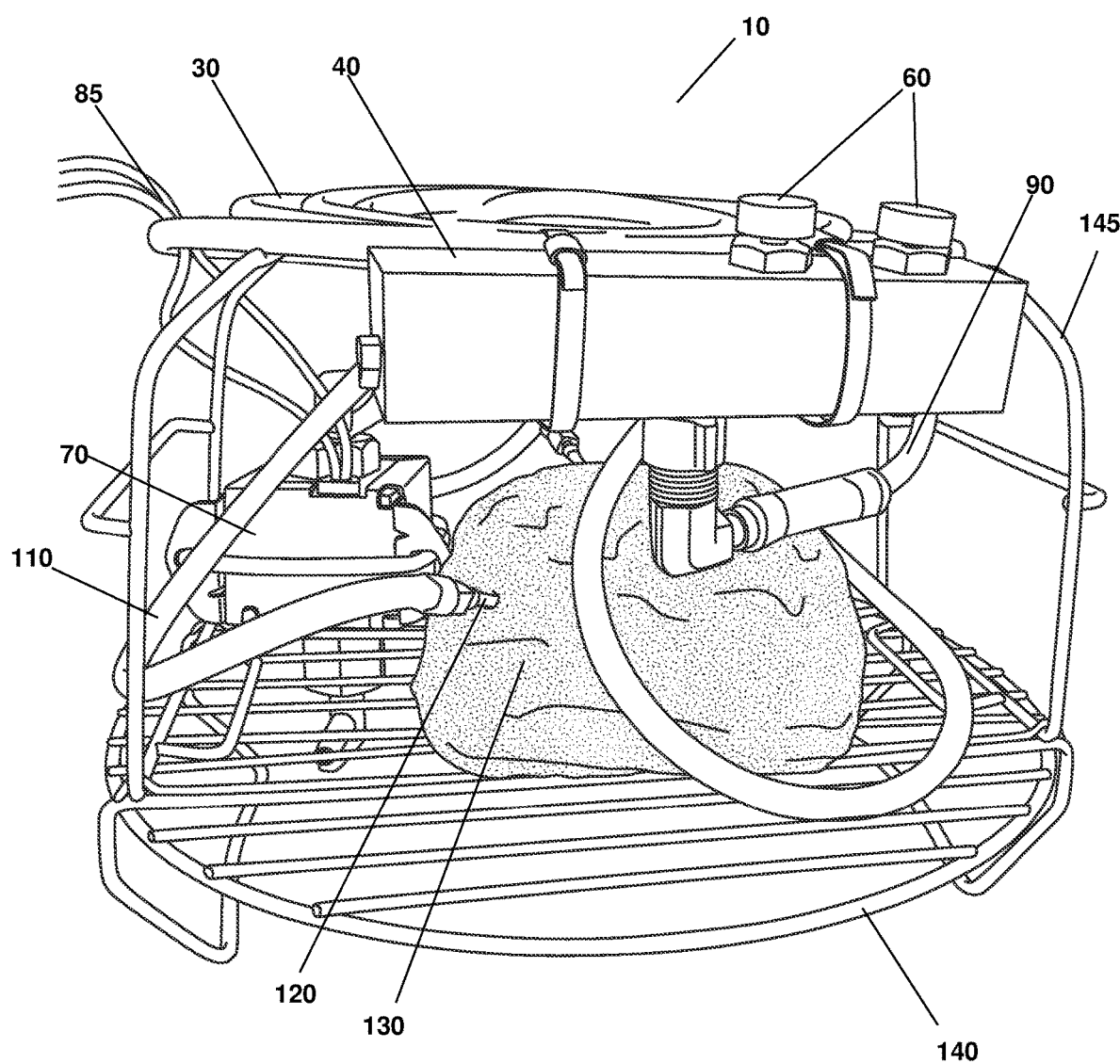
FIG. 3 shows a front elevation view of the device of FIG. 1 without a cooking vessel.

FIG. 3 shows a front elevation view of the device of FIG. 1 without a cooking vessel. In the embodiment shown, each of the heating element 30, the manifold 40, the pump 70, and the piece of food 130 is supported by and/or attached to either a lower part of a metal grate 140 or an upper part of a metal grate 145. In the figures, the lower part of the metal grate 140 includes lower legs which support the lower part of the metal grate such that a majority of the lower part of the metal grate 140, as well as any components of the device 10 that rest thereon, are substantially separated from the bottom side of the cooking vessel 20 (not shown). In some embodiments, the various components of the device 10 may be removably attached and/or arranged in any way within the cooking vessel 20 such that they do not interfere with the processes of any of the individual components thereof, including being placed on the bottom side of the cooking vessel 20 or attached to a side wall thereof.

Figure 4:
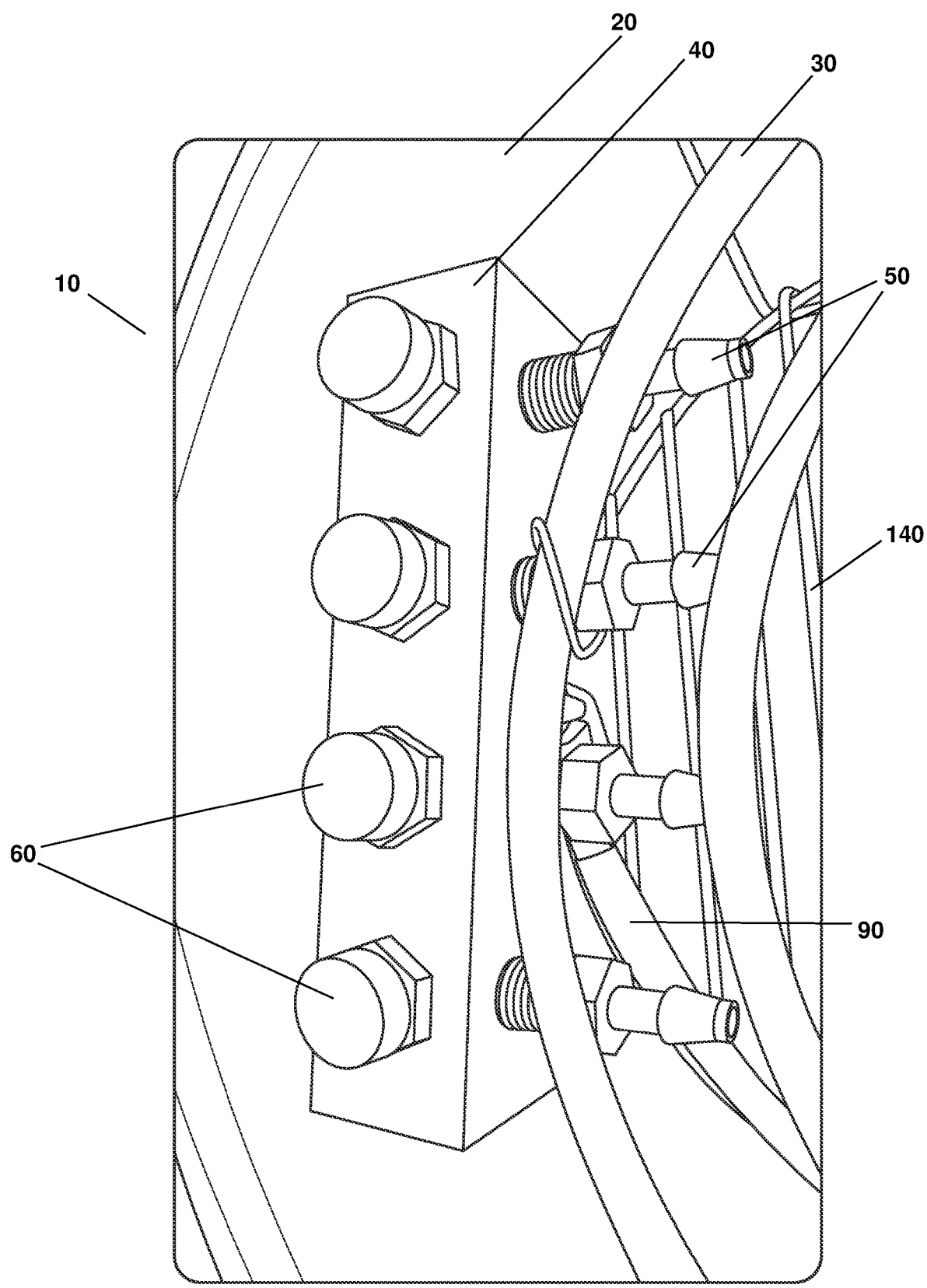
FIG. 4 shows a zoomed-in top and front perspective view of a part of the device of FIG. 1.
Figure 5:
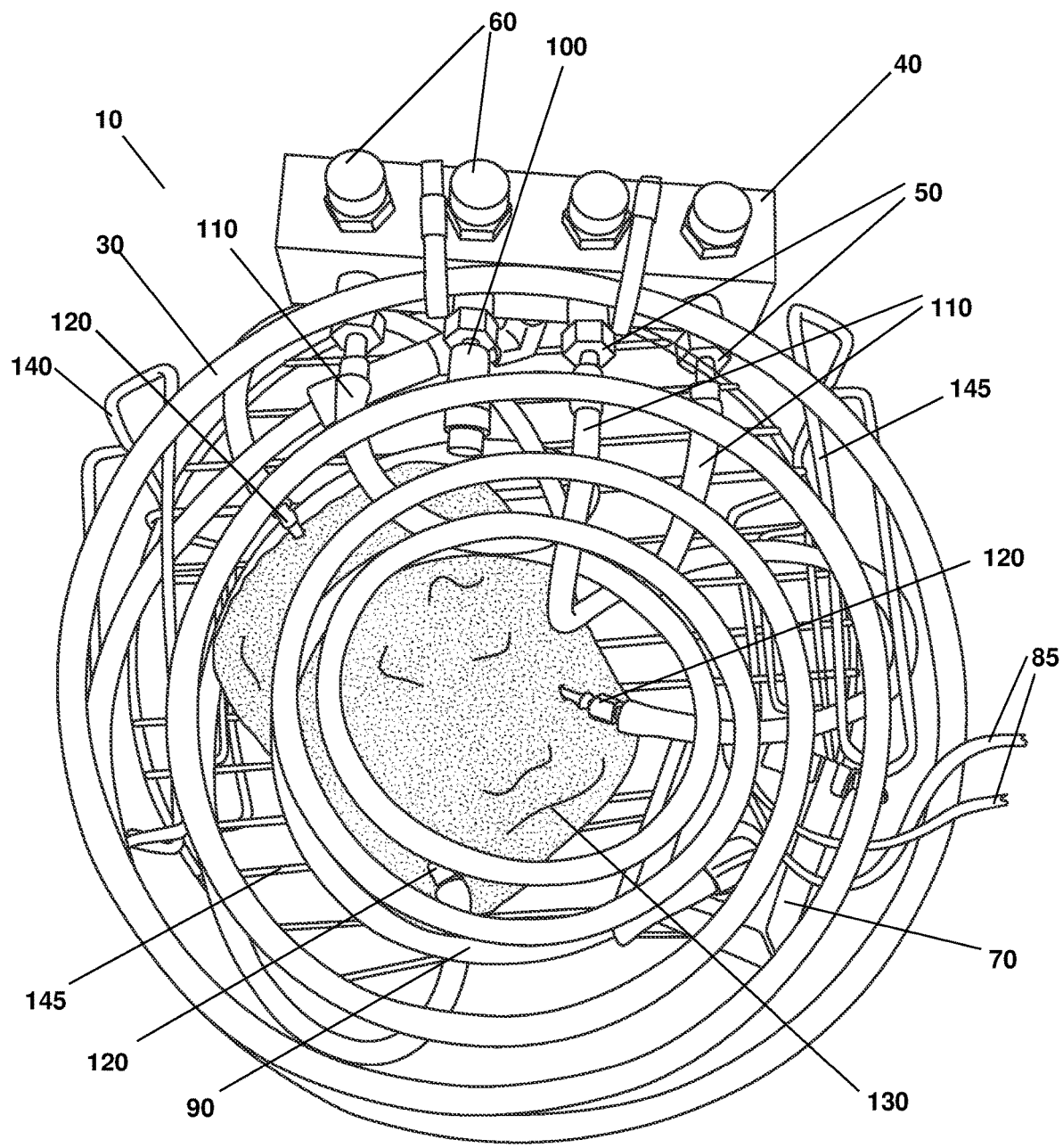
FIG. 5 shows a top plan view of the device of FIG. 1 without a cooking vessel.

FIG. 4 shows a zoomed-in top and front perspective view of a part of the device of FIG. 1. FIG. 5 shows a top plan view of the device of FIG. 1 without a cooking vessel. The valves 60 of the manifold 40 are, as shown, cylindrical controllers. The valves 60 are rotatably positionable into at least two positions: an open position, in which an external entry/exit point of a respective opening 50 of the manifold 40 is substantially unencumbered, such that a liquid may flow there-through, and a closed position, in which the external entry/exit point of a respective opening 50 of the manifold 40 is substantially encumbered, such that flow of a liquid there-through is substantially prevented. In embodiments, the valve 60 may have at least one additional position between the open position and the closed position, in which the external entry/exit point of a respective opening 50 of the manifold 40 is partially encumbered, such that flow of a liquid there-through is permitted at a reduced rate when compared to the rate corresponding to the open position. The valves, and thus, the flow control and distribution of liquid through the manifold may be controlled using an electronic controller instead of or in addition to manual valves. The electronic controller allows timing of the opening of each port, run time, and flow rate to be preset or changed during operation of the devices of embodiments of the disclosed technology.

The manifold 40 has a hollow internal compartment suitable for holding liquid. The internal compartment may be filled or emptied by way of the openings 50, such as by way of removing a portion of the opening 50, filling or emptying the internal compartment, and then replacing the removed portion of the opening 50. In other embodiments, the internal compartment may be filled or emptied by way of removing a planar sidewall thereof, such as the planar sidewall which includes the valves 60, filling or emptying the internal compartment, and then replacing the removed planar sidewall.

In embodiments, the internal compartment of the manifold 40 includes at least two internal compartments, each of which is accessible by at least one of the openings 50. In some embodiments, each of the openings 50 is connected to an individual internal compartment. When fully sealed (i.e. not opened for filling or emptying), each of the internal compartments of the manifold 40 is substantially watertight, such that substantially no liquid within an individual compartment exits the compartment, and no liquid external to the individual compartment enters the compartment, except by way of passing through the connected opening 50 when the respective valve 60 is in an open or partially-open position. As such, when the compartments are sealed and the respective valves are in the closed positions, substantially no liquid within one compartment enters any other compartment. In some embodiments, the manifold 40 may include removably internal dividers, such that the number of internal compartments may be variable.

The pump 70 is connected to the manifold 40 by way of the hollow tube 90. The pump is connected to each internal compartment of the manifold 40, such that air driven by the pump 70 causes pressure within each internal compartment of the manifold 40. The pressure exerted by the pump is sufficient to cause liquid within the manifold compartments to exit the compartment by way of the opening 50 when the valve 60 is in an open or partially open position, but is insufficient to cause liquid within the manifold compartments to exit the compartment by way of the opening 50 when the valve 60 is in a closed position.

Figure 6:
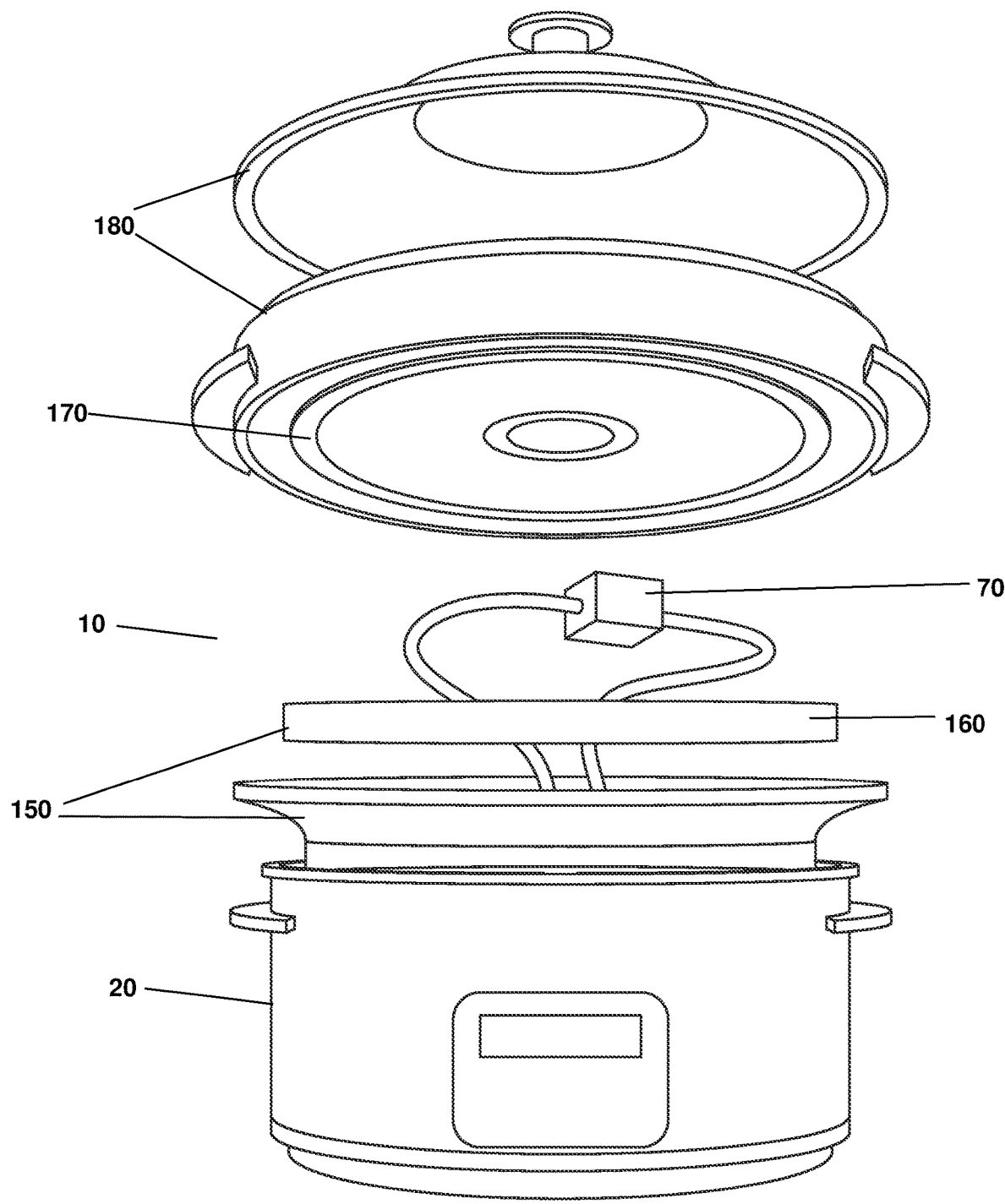
FIG. 6 shows an exploded front elevation view of a Continuous Injector-Baster Device of another embodiment of the disclosed technology.

FIG. 6 shows an exploded front elevation view of a Continuous Injector-Baster Device of another embodiment of the disclosed technology. In this embodiment, the food 130 (not visible) and at least a majority of components of the device 10 are within the cooking vessel 20 and the cooking vessel inserts 150. In this embodiment, the cooking vessel 20 further includes a lid 180 which incorporates a heating element 170. The heating element 30 of the device 10 may be replaced by and/or operated in addition to the heating element 170 of the lid 180.

The lid 180 may incorporate, in whole or in part, the pump 70, the manifold 40, the hollow injector tube or tubes 110, and the basting spray head or heads 100. The lid 180 may furthermore act and/or be retrofitted to act as a power source which powers or assists in powering the heating element 30 or the pump 70. Additionally, the pump 70, the manifold 40, the hollow injector tube or tubes 110, and the basting spray head or heads 100 may be removably attached, in whole or in part, to any portion of the lid 180 such that substantially every operation of the lid is unencumbered.

In some embodiments, one or more of the pump 70, the power source 80 connected to the pump 70, and the manifold 40 are positioned outside of the cooking vessel 20 while the device 10 is in operation. The cooking vessel 20 may include a gasket 160 which is internal to and flush against substantially every part of an opening between the lid 180 and the cooking vessel 20 and/or between the lid 180 and the lower cooking vessel insert 150. The gasket 160 may be made of an insulating material, such that substantially no heat passes there-through. The gasket 160 may further be made of a material which has sufficient malleability and resilience that when a component of the device 10, such as a hollow tube or a wire, passes from within the cooking vessel 20 to without the cooking vessel 20 while the gasket 160 is placed internal to and flush against substantially every part of the opening between the lid 180 and the cooking vessel 20 and/or between the lid 180 and the lower cooking vessel insert 150, the gasket 160 is deformed substantially only at a location thereof which touches the component passing there-over, and when the component is no longer passing there-over, the gasket 160 is substantially identical in shape as compared to its shape before the component was passed there-over. In some embodiments, the gasket 160 may be sized and manufactured to fit a pre-existing cooking vessel 20, as a retrofit.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A continuous injector and baster device for use within a cooking vessel equipped with a heating element, the device comprising:
    a manifold;
    a pump adapted to be removably connected to said manifold;
    at least one hollow injector tube connected at a first end thereof to said manifold; and
    at least one basting spray head connected at a first end thereof to said manifold;
    wherein said hollow injector tube is removably connected at a second end thereof for placement at a point within said cooking vessel where a piece of food is expected.

2. The device of claim 1, wherein each tube of said plurality of hollow injector tubes is connected at said second end thereof to an injector needle.

3. The device of claim 2, wherein said at least one hollow injector tube comprises a plurality of hollow injector tubes; and
    wherein said at least one basting spray head comprises a plurality of basting spray heads.

4. The device of claim 3, wherein said manifold comprises a plurality of openings;
    wherein each of said openings is controlled by a dedicated valve;
    wherein each said valve comprises a cylindrical controller which is rotatably positionable into at least an open position and a closed position.

5. The device of claim 4, wherein each tube of said plurality of hollow injector tubes and each head of said plurality of basting spray heads is removably attachable at said first ends thereof to each opening of said plurality of openings of said manifold.

6. The device of claim 5, wherein said manifold further comprises a plurality of internal compartments;
    wherein each compartment of said plurality of internal compartments is connected to at least one opening of said plurality of openings;
    wherein each compartment of said plurality of internal compartments is individually connected to said pump.

7. The device of claim 6, wherein each compartment of said plurality of internal compartments is adapted to hold a unique liquid therein, such that while every valve of said plurality of openings is in said closed position, each unique liquid will remain unadulterated by every other unique liquid within said plurality of internal compartments.

8. The device of claim 2, wherein said manifold is located within and/or attached to said heating element, such that at least one liquid located within said manifold is heated by said heating element.

9. The device of claim 8, wherein at least one tube of said plurality of hollow injector tubes is removably attached and/or is proximate to said heating element, such that at least one liquid located within said tube is heated by said heating element.

10. The device of claim 8, wherein said pump is located within and/or attached to said heating element, such that operation of said pump is driven by said heating element.

11. A kit comprising:
    the continuous injector and baster device of claim 1; and
    a cooking vessel, said cooking vessel comprising a convection heating element.

12. The kit of claim 11, wherein said manifold comprises a plurality of openings;
    wherein each of said openings is controlled by a dedicated valve;
    wherein each said valve comprises a cylindrical controller which is rotatably positionable into at least an open position and a closed position;
    wherein said manifold is removably attachable to said convection heating element;
    wherein each tube of said plurality of hollow injector tubes is connected at a second end thereof to an injector needle;
    wherein said at least one hollow injector tube comprises a plurality of hollow injector tubes; and
    wherein said at least one basting spray head comprises a plurality of basting spray heads.

13. The kit of claim 12, wherein each tube of said plurality of hollow injector tubes and each head of said plurality of basting spray heads is removably attachable at said first ends thereof to each opening of said plurality of openings of said manifold at a point vertically below a point of connection between said manifold and said convection heating element;
    wherein said manifold further comprises a plurality of internal compartments;
    wherein each compartment of said plurality of internal compartments is connected to at least one opening of said plurality of openings;
    wherein each compartment of said plurality of internal compartments is individually connected to said pump.

14. The kit of claim 13, wherein each compartment of said plurality of internal compartments is adapted to hold a unique liquid therein, such that while every valve of said plurality of openings is in said closed position, each unique liquid will remain unadulterated by every other unique liquid within said plurality of internal compartments;

wherein each compartment of said plurality of internal compartments is located proximally to said convection heating element, such that said unique liquid held therein is heated by said proximity to said convection heating element.

15. The kit of claim 12, wherein said manifold is located within and/or attached to said heating element, such that at least one liquid located within said manifold is heated by said heating element;
  wherein when said pump operates while without said cooking vessel, a connection between said pump and said manifold is such that operation of said convection heating element is substantially unaffected.

16. The kit of claim 15, wherein at least one tube of said plurality of hollow injector tubes is removably attached and/or is proximate to said convection heating element, such that at least one liquid located within said tube is heated by said convection heating element.

17. The kit of claim 15, wherein said pump is located within and/or attached to said convection heating element, such that operation of said pump is driven by said heating element.

18. A method of using the device of claim 1 in a cooking vessel equipped with a heating element, comprising steps of, in any order:
  inserting at least one liquid into said manifold;
  attaching at least one basting spray head to at least one opening of said manifold;
  attaching at least one hollow injector tube to at least one opening of said manifold at a first end thereof;
  attaching said at least one hollow injector tube to an injector needle at a second end thereof;
  placing said second end of said at least one injector tube and said injector needle at said second end thereof at a point within said cooking vessel where a piece of food is expected;
  opening a valve of said manifold connected to an opening of said manifold where said at least one baster spraying head and/or where said at least one hollow injector tube is attached;
  turning on said heating element of said cooking vessel; and
  turning on said pump.

19. A method of using the kit of claim 11, comprising steps of, in any order:
  inserting at least one liquid into at least one said compartment of said manifold;
  attaching at least one basting spray head to at least one opening of said manifold;
  attaching at least one hollow injector tube to at least one opening of said manifold at a first end thereof;
  placing said second end of said at least one injector tube and said injector needle at said second end thereof at a point within said cooking vessel where a piece of food is expected;
  opening a valve of said manifold connected to an opening of said manifold where said at least one baster spraying head and/or where said at least one hollow injector tube is attached; and
  turning on said convection heating element of said cooking vessel.

20. The method of claim 19, further comprising a step of attaching said at least one hollow injector tube to an injector needle at a second end thereof;
  wherein said step of turning on said convection heating element of said cooking vessel further comprises simultaneously turning on said pump.

* * * * *